US009732806B2

(12) United States Patent
Jones

(10) Patent No.: US 9,732,806 B2
(45) Date of Patent: Aug. 15, 2017

(54) FLUID ACTUATED OVER-CENTER CLUTCH FOR A PTO

(71) Applicant: Twin Disc, Inc., Racine, WI (US)

(72) Inventor: Darrel A. Jones, Kenosha, WI (US)

(73) Assignee: Twin Disc, Inc., Racine, WI (US)

( * ) Notice: Subject to any disclaimer, the term of this patent is extended or adjusted under 35 U.S.C. 154(b) by 146 days.

(21) Appl. No.: 14/694,864

(22) Filed: Apr. 23, 2015

(65) Prior Publication Data

US 2015/0308517 A1    Oct. 29, 2015

Related U.S. Application Data

(60) Provisional application No. 61/983,246, filed on Apr. 23, 2014.

(51) Int. Cl.
| F16D 25/08 | (2006.01) |
| F16D 48/02 | (2006.01) |
| F16D 13/38 | (2006.01) |
| F16D 23/12 | (2006.01) |

(52) U.S. Cl.
CPC ......... *F16D 25/087* (2013.01); *F16D 25/083* (2013.01); *F16D 48/02* (2013.01); *F16D 13/385* (2013.01); *F16D 23/12* (2013.01); *F16D 2048/0212* (2013.01); *F16D 2500/1026* (2013.01); *F16D 2500/1028* (2013.01); *F16D 2500/10437* (2013.01); *F16D 2500/111* (2013.01)

(58) Field of Classification Search
CPC .... F16D 25/082; F16D 25/083; F16D 25/087; F16D 2048/0212; F16D 2500/10437; Y10T 29/49716

USPC ........................................................ 192/70.13
See application file for complete search history.

(56) References Cited

U.S. PATENT DOCUMENTS

| 3,672,478 A * | 6/1972 | Riese ...................... F16D 13/72 192/113.34 |
| 5,533,603 A * | 7/1996 | Terranova ............... F16D 13/04 192/35 |
| 6,050,162 A | 4/2000 | Kalinsky |
| 6,305,515 B1 | 10/2001 | Heidenreich et al. |
| 7,225,909 B1 | 6/2007 | Kalinsky et al. |
| 7,694,794 B2 | 4/2010 | Biles et al. |
| 8,657,093 B1 | 2/2014 | Kalinsky et al. |

(Continued)

FOREIGN PATENT DOCUMENTS

| WO | 03077407 | 9/2003 |
| WO | 04001252 | 12/2003 |

*Primary Examiner* — Richard Lorence
(74) *Attorney, Agent, or Firm* — Boyle Fredrickson S.C.

(57) ABSTRACT

A hollow double-acting cylinder assembly may be mounted over a shaft and to a housing. A moveable piston of the cylinder assembly connects to a sliding sleeve of an over-center mechanism and the sliding sleeve with a thrust bearing allowing it to push and pull the sleeve mechanism with cylinder action. A toggle action of the over-center mechanism locks clutch without the need to sustain pressure on the cylinder after engagement/disengagement motion. As the clutch is typically engaged for sustained periods of time, this prevents constant hydraulic pressure applied to the over-center mechanism and significantly reduces wear. Hydraulic/pneumatic hoses may pass through the housing and connect to engage and disengage bores of the cylinder via remotely actuated control valve(s).

20 Claims, 7 Drawing Sheets

(56) References Cited

U.S. PATENT DOCUMENTS

2006/0032722 A1 2/2006 Guinter et al.
2010/0304912 A1* 12/2010 Sime .................. F16D 25/0638
　　　　　　　　　　　　　　　　　　　　　　475/5
2012/0042743 A1 2/2012 Hunold et al.

* cited by examiner

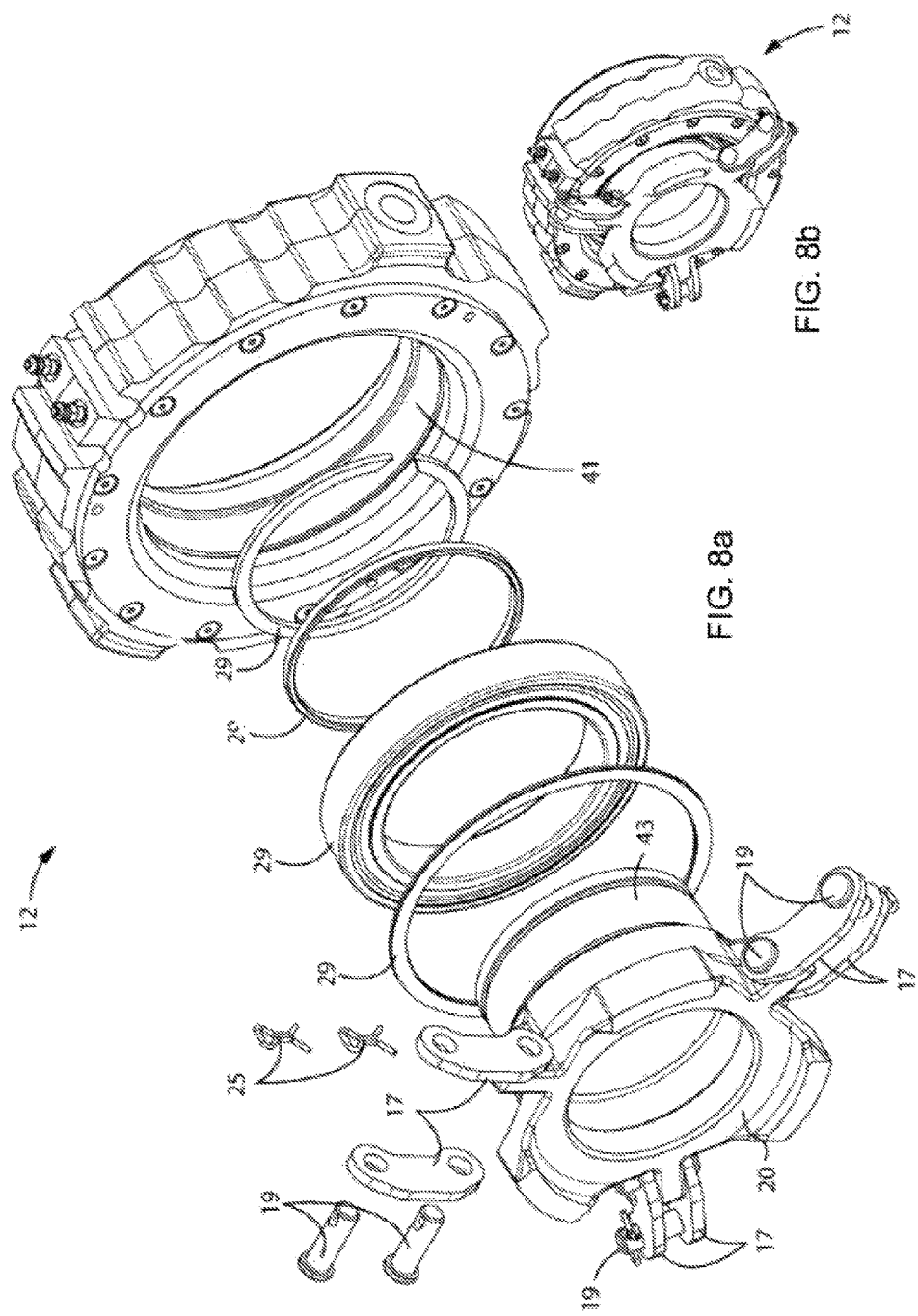

FLUID ACTUATED OVER-CENTER CLUTCH FOR A PTO

CROSS REFERENCE TO RELATED APPLICATIONS

This application claims a benefit of priority under 35 USC §119 to U.S. Provisional Patent Application No. 61/983,246 filed Apr. 23, 2014, the entire contents of which are hereby expressly incorporated by reference into the present application.

BACKGROUND OF THE INVENTION

Field of the Invention

The present invention relates in general to the field of retrofitted hydraulic/pneumatic clutches and power take-offs "PTOs". The terms hydraulic and pneumatic are used interchangeable and are intended to mean pressurized fluids in general, for example, pressurized hydraulic oil or compressed air.

Discussion of the Related Art

A power take-off or power takeoff (PTO) is any of several apparatus and methods for taking power from a power source, such as a running engine, and transmitting it to an application such as an attached implement, or separate machines. Most commonly, it is a system comprising a flywheel of an engine, which may be in a vehicle or another tool, can be easily connected and disconnected to a corresponding input shaft on the application end. The power take-off allows implements to draw energy from the engine. Semi-permanently mounted power take-offs can also be found on industrial and marine engines, for example. These applications typically use a drive shaft and bolted joint to transmit power to a secondary implement or accessory. In the case of a marine application, such shafts may be used to power pumps.

Commonly used PTOs use a hand lever that is manually pivoted to engage and disengage a clutch that transfers rotary motion from the PTO to the machine (such as a pump). The hand lever is typically attached directly to a bell housing that protects the clutch assembly within the PTO. In order to actuate the clutch, an operator must be located next to the bell housing which means the operator cannot operate the vehicle or tool equipped with the PTO, as the operator must be present by the bell housing.

Known hydraulically actuated clutches and PTOs use a rotary union, or collector, and drilled shafts to route oil/air to a rotating piston/cylinder. These devices require a large portion of the entire clutch actuation assembly to be replaced with a costly substitute. They also require larger cylinder areas that use lower pressure through the rotary union or collector. Such systems must maintain the applied pressure in order to keep the clutch engaged which generates heat and wear on multiple components, thus, reducing system efficiency.

Hydraulic actuators have also been introduced to remotely actuate the clutch allowing the operator to remain in a driver seat or cabin of the vehicle or any other remote location. While this addressed one problem, it introduced new problems. The mechanical linkage assembly is typically completely replaced with a hydraulic assembly. This introduces a significant cost and also a complicated retrofit procedure. Also, due to the nature of the hydraulic operation, hydraulic pressure is required at all times during clutch engagement in order to operate the PTO machine (e.g., a pump).

In one example, a hydraulic PTO clutch works by first pressurizing the cylinder. This forces the piston to clamp and lock the friction and steel clutch discs. When pressure is removed, the steel clutch disks and clutch friction disks, with the use of springs within the clutch pressure plate for example, thus, disengaging the clutch pressure plate from the clutch. When there is no pressure applied to the cylinder, there is a clearance maintained between the friction and steel clutch pressure plate disks. As a result, consistent pressurization of the cylinder and engagement of the piston is required for the clutch to remain actuated. The constant hydraulic force present increases the wear of the hydraulic parts as the forces are present for the whole duration of work required by the application.

What was therefore needed is a hydraulic PTO clutch actuation device that only requires hydraulic pressure during engagement and disengagement. What also needed is a hydraulic PTO clutch that remains engaged without constant hydraulic pressure. What additionally desired is a hydraulic PTO clutch that retains the mechanical linkage to avoid costly replacement parts and increased labor.

SUMMARY OF THE INVENTION

A hydraulically or pneumatically actuated, over-center clutch may be used with a power take off unit which includes a stationary, hollow cylinder assembly with a movable piston connected to a sliding sleeve. A thrust bearing in contact with the sliding sleeve is configured to push and pull the sliding sleeve along the cylinder. A shaft may pass through the central axis of the hollow portion of the cylinder assembly. A housing may be configured to contain the cylinder assembly and the shaft.

The fluid actuated, over-center clutch may also be configured to be retrofittable onto the power take off unit of, for example, a tractor. When retrofitting the hydraulically actuated, over-center clutch, the pre-existing mechanical linkage may be connected to the clutch and a pre-existing hydraulic (or pneumatic) pressure supply of the power source may be configured to selectively apply the pressure to the cylinder.

Pressure applied to the cylinder assembly is only needed during the engagement and disengagement periods, which only occur when the sliding sleeve is in motion. The sliding sleeve is selectively actuated in a linear motion during the engagement period and in an opposite linear motion during the disengagement period. One of a hydraulic and a pneumatic pressure may be used (or both) to actuate the sliding sleeve.

In a preferred embodiment, a fluid actuated, over-center clutch for a power take off unit includes a stationary and hollow cylinder assembly with a movable piston coupled to a sliding sleeve, a thrust bearing in contact with the sliding sleeve configured to push and pull the sliding sleeve along the cylinder, and a shaft passing through the central axis of the hollow portion of the cylinder assembly. In addition, a housing containing the cylinder assembly and the shaft is provided and wherein the sliding sleeve is selectively actuated such that a pressure is applied to the cylinder only during at least one of engagement and disengagement. The pressure is not applied when the sliding sleeve is not in motion.

In another aspect of this embodiment, the fluid actuated, over-center clutch is configured to retrofit on the power take off unit of an engine.

In yet another aspect of this embodiment, engagement and disengagement periods only occur when the sliding sleeve is in motion and the sliding sleeve is selectively actuated in a linear motion during the engagement period and in an opposite linear motion during the disengagement period.

In another embodiment, a retrofittable clutch for a power take off unit includes a hollow cylinder assembly, and a sliding sleeve slidably attached to the cylinder configured to selectively slide in opposing directions. In addition, a shaft passing through the central axis of the hollow cylinder assembly is provided and wherein a pressure is selectively applied to the cylinder only during motion of the sliding sleeve and is not applied when the sliding sleeve is in a stationary position.

In another aspect of this embodiment, the cylinder in contact with the thrust bearing is configured to selectively apply the force to the sleeve, causing the sliding sleeve to move in opposing directions along the cylinder. The selectively applied pressure to the cylinder is one of a hydraulic and pneumatic pressure from the power source.

In an additional aspect of this embodiment, the clutch is a hydraulically actuated, over-center clutch configured to retrofit on the power take off unit.

According to another embodiment, a method of retrofitting an actuation system for an over-center clutch on a power take off unit includes providing a cylinder assembly, connecting a sliding sleeve to the cylinder assembly, attaching a thrust bearing in contact with the sliding sleeve configured to selectively apply a linear force to the sliding sleeve in opposing directions, passing a shaft passing through the central axis of the hollow portion of the cylinder assembly, and containing the cylinder assembly and the shaft within a housing. In addition, the method includes selectively applying a pressure to the sliding sleeve creating a linear force on the thrust bearing to engage the over-center clutch and not applying pressure when the sliding sleeve is in a stationary position.

In another aspect of this embodiment, the method further includes using the power take off unit to supply the pressure to the cylinder and utilizing a pre-existing, mechanical linkage from the power take off unit to engage and disengage the clutch.

According to an additional aspect, the method further includes utilizing a pre-existing hydraulic system of an instrument to selectively apply the pressure on the thrust bearing and selectively applying a pressure creating a linear force on the thrust bearing to disengage the clutch.

In an additional aspect, the cylinder is kept in an engaged position without constantly applying the pressure.

According to yet another aspect of this embodiment, the method further includes replacing the removed portion of the pre-existing mechanical clutch linkage from the power take off unit with the cylinder assembly, and moving a lever with the sliding sleeve to engage and disengage the over center clutch.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention and of the construction and operation of typical mechanisms provided with the present invention will become more readily apparent by referring to the exemplary, and therefore non-limiting, embodiments illustrated in the drawings accompanying and forming a part of this specification, wherein like reference numerals designate the same elements in the several views, and in which:

FIG. 8a is a partially exploded perspective view of the cylinder assembly according to FIG. 1 installed with alternative fasteners and FIG. 8b is a perspective view of the assembled cylinder assembly according to FIG. 8a.

Figure 1:
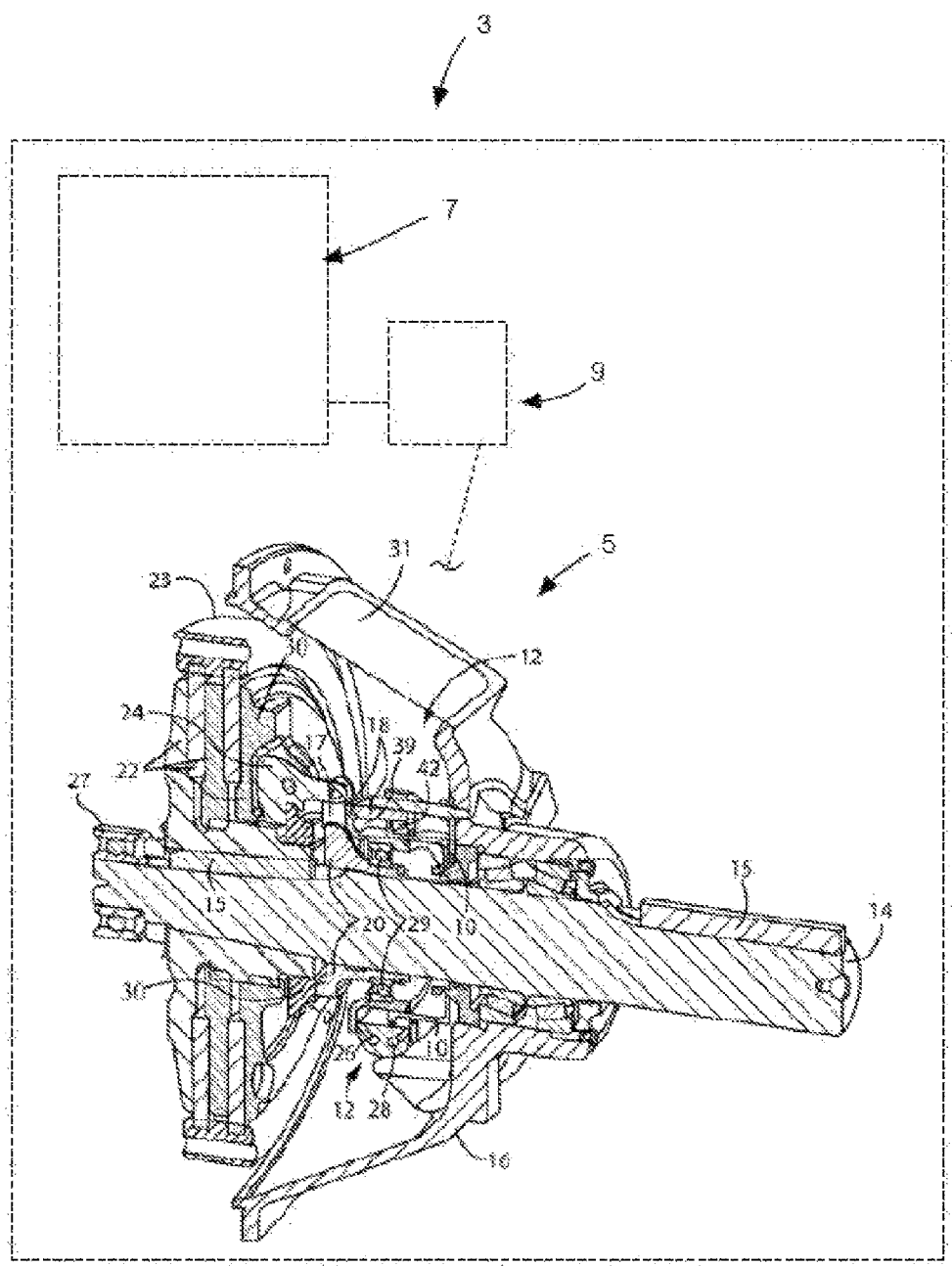
FIG. 1 is a cross-sectional perspective view of a preferred embodiment of the retrofittable ROC clutch showing the clutch in an engaged position.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. Additionally, the terms hydraulic and pneumatic are used interchangeable and are intended to both mean pressurized fluids in general, including but not limited to pressurized hydraulic oil as well as compressed air. They are not limited to direct connection but include connection through other elements where such connection is recognized as being equivalent by those skilled in the art.

DETAILED DESCRIPTION OF EMBODIMENTS

The preferred embodiments consist of a compact design for a hydraulic retrofit for clutch actuation in a PTO unit. The hydraulic retrofit is designed to fit within the PTO's bell housing and replaces the manual lever actuation, fulcrum, and fork of the mechanical clutch. The preferred embodiments further eliminates the need for a dedicated hydraulic circuit and cooling system to remotely engage the clutch by using the hydraulics of existing equipment utilizing the PTO. The retrofitted design utilizes approximately 90% of the existing mechanical (lever actuated) PTO. Using the existing mechanical linkage, costs are minimized, and the clutch may be kept in an engaged position without the need of constant application of pressure.

As a result, the preferred embodiments may be offered as a low cost retrofit to gain remote actuation of the clutch without compromising service life. The apparatus may easily be added to existing production PTOs as a remote control option. The apparatus can also be adapted to similar over-center clutches. The inventive design can utilize higher pressures than otherwise practical for use with rotary unions or collectors, thus, allowing dimensions of the piston area to be kept at a minimum and still meet the requirements for clutch actuation. By keeping the piston to a smaller size, less pressure is needed to actuate the clutch. A simple flow adjustment may also be performed to fine tune the clutch engagement point and enhance reliability of clutch engagements.

Figure 2:
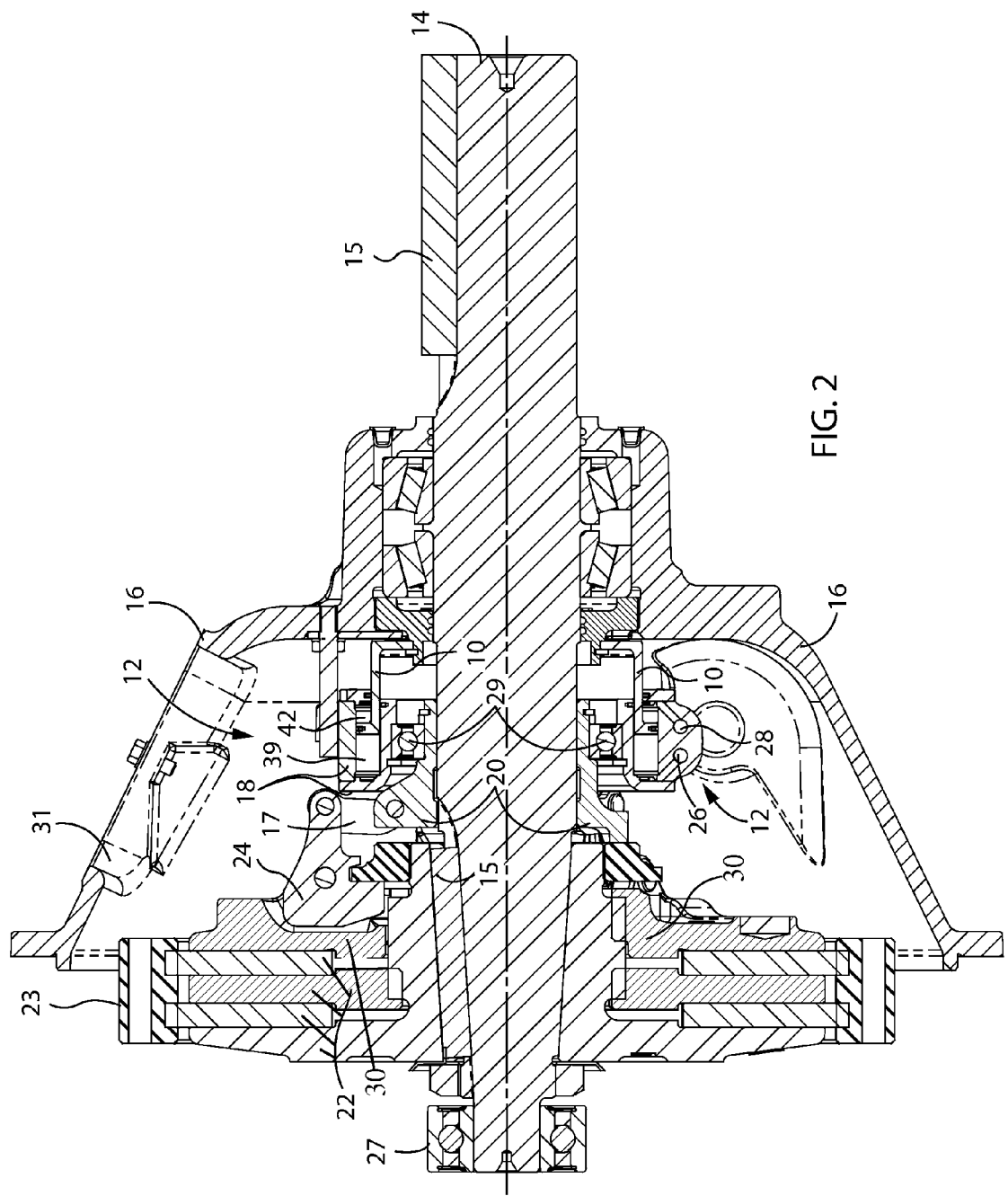
FIG. 2 is a cross-sectional side view of the retrofittable ROC clutch of FIG. 1.
Figure 3:
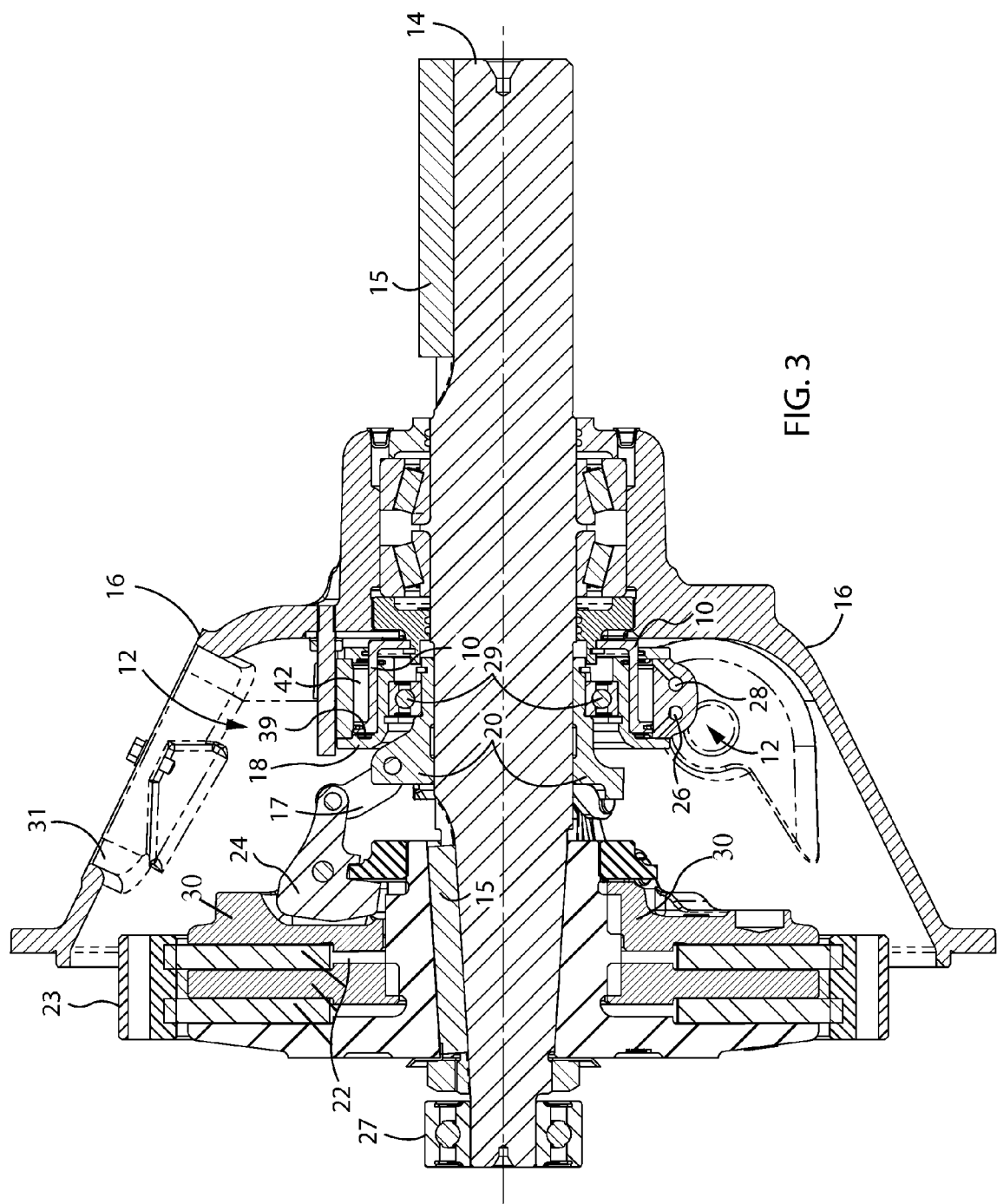
FIG. 3 is a cross-sectional side view of the retrofittable ROC clutch showing the clutch pressure plate in a disengaged position.
Figure 4:
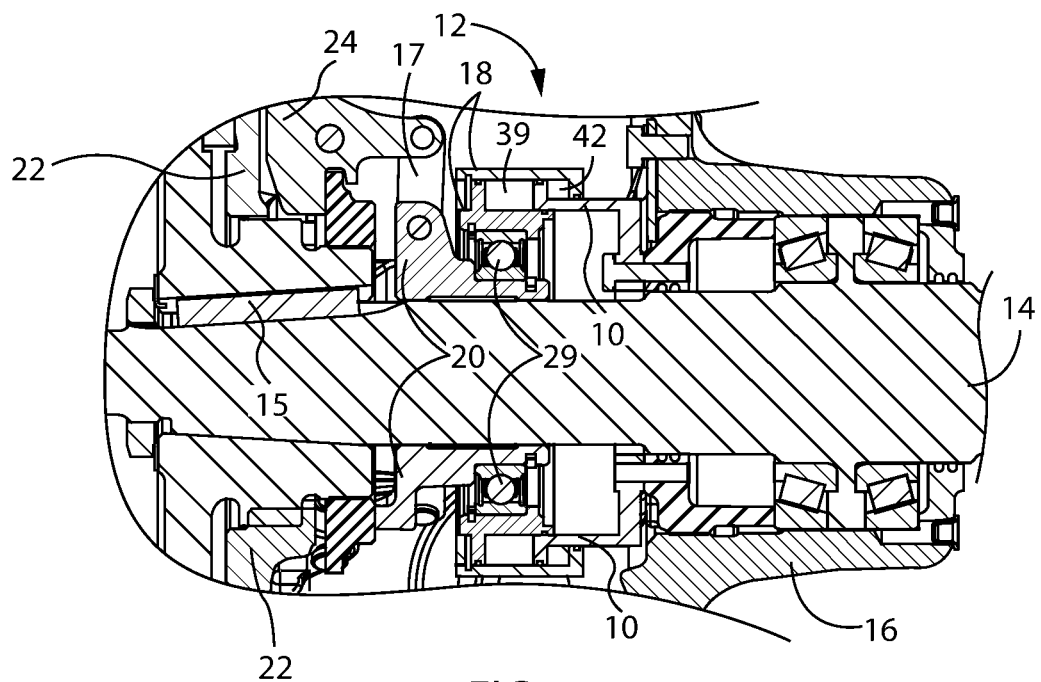
FIG. 4 is a close-up view of the cylinder assembly according to FIG. 1 installed with alternative fasteners.

Referring to the simplified partially schematic representation of FIG. 1, tool 3 is shown with PTO unit 5 that receives power from power source 7, which may be an engine. Tool 3 may have its own pre-existing hydraulic pressure supply, represented here as pressure supply 9. Pressure supply 9 provides hydraulic pressure for use by PTO unit 5, such as actuating various components, as described in greater detail elsewhere herein. Referring now to FIGS. 1, 2, and 4, a clutch 22 is shown in an engaged position, the clutch disk is also present but unseen in the drawings. The clutch 22 is referred to for simplicity but is meant to encompass both the clutch discs and a pressure plate 30. The lever and fork mechanism (not shown) from the manual engagement mechanism have been removed and replaced by the ROC (remote over center) clutch cylinder assembly 12 of the preferred embodiments. All other components of the clutch 22 and mechanical linkage are kept intact and utilized. By using the existing linkage, hydraulic pressure is only applied during the engagement and disengagement stroke of the sliding sleeve 20. After the cylinder assembly 12 is retrofitted in place, the pre-existing mechanical linkage, including the lever 24 and link 17, retains the clutch pressure plate 30 in an engaged position through an over-center locking mechanism. The lever 24 and link 17 may also be moved with hydraulic power into a disengaged position, shown, for example, in FIGS. 3 and 5, thus disengaging the clutch pressure plate 30.

A stationary, hollow, compact, double-acting cylinder assembly 12 may be mounted over a shaft 14 (the shaft passes through the center of the cylinder assembly 12 along its axis) and is mounted within the housing 16. By comparison, in the pre-existing mechanical actuation assembly, the area over the shaft is commonly used by a clutch pressure plate fork and thrust collar actuated manually with a lever (not shown). A movable piston 18 of the cylinder assembly 12 is preferably connected to a sliding sleeve 20 that slides along the longitudinal axis of the shaft 14 pushing and pulling the movable piston 18 of the cylinder assembly 12. As the sliding sleeve 20 is pushed and pulled along the shaft 14, the link 17 is pivoted into an approximately vertical position which pushes the lever 24 against the clutch pressure plate 30 to engage it, or pulls away from the clutch pressure plate 30 to disengage it.

The movable piston 18 may be in the form of a piston which compresses a hydraulic fluid as it is extended and also as it is retracted. An engage bore 39 may be filled with hydraulic fluid to push the movable piston 18 toward the clutch pressure plate 30 which also pushes the sliding sleeve 20 and causes the link 17 to pivot into the over-center position and engage the clutch pressure plate 30. The over-center design locks the link 17 in place and keeps the clutch pressure plate 30 engaged without the need of consistent pressure from the movable piston 18 (by way of the applied hydraulic fluid).

While the clutch 22 is engaged, the drive ring 23 transfers rotational motion from the power source through the clutch 22 to the shaft 14, for example, through a tapered fit and key 15 that connect clutch 22 to shaft 14, and ultimately to the driven equipment. A bearing 27 ensures smooth operation of the shaft 14 and limits any radial movement while the shaft 14 is rotating. The machine driven by the clutch (not pictured), which may include a device such as a pump, may be connected to the shaft 14, for example, through a keyed connection with key 15 at an output end of shaft 14, and ultimately driven by the PTO.

Figure 5:
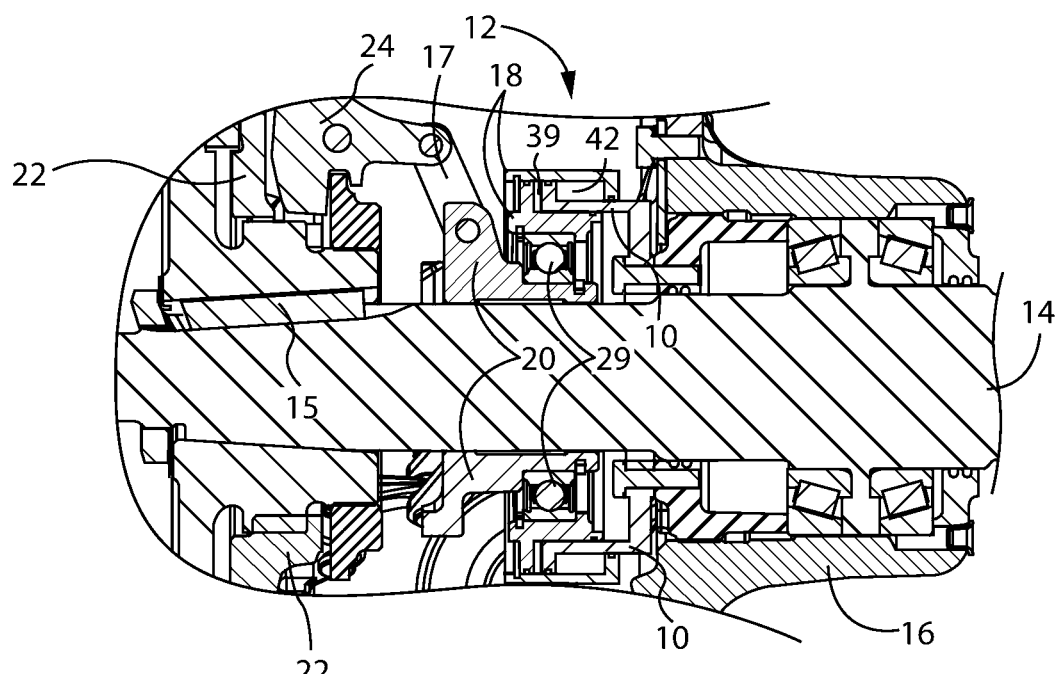
FIG. 5 is a close-up view of the cylinder assembly according to FIG. 3 installed with alternative fasteners.

When disengagement of the clutch 22 is desired, hydraulic fluid is pumped into the disengagement bore 42 and the movable piston 18 is retracted away from the clutch pressure plate 30. The retraction pulls the sliding sleeve 20 away from the clutch pressure plate 30 along the shaft 14 and pivots the link 17 into a disengaged position, as shown in FIGS. 3 and 5. When the link 17 is pulled into the disengaged position, the lever 24 pulls the clutch pressure plate 30 thereby disengaging the clutch 22 such that the rotation of the drive ring 23 ceases to rotate the shaft 14.

As stated, the clutch 22 may be disengaged when the sliding sleeve 20 is pulled away and retracted from the clutch pressure plate 30. The sliding sleeve 20 portion of the over-center clutch rotates along with the shaft 14 while the movable piston 18 of the cylinder assembly 12 only moves axially along the shaft 14 and does not rotate.

This toggle action of the link 17 locks the clutch pressure plate 30 into an engaged position without the need to sustain pressure on the sliding sleeve 20 after the engagement/disengagement motion. As the clutch 22 is typically engaged for sustained periods of time, this prevents constant hydraulic pressure applied to the sliding sleeve 20 and significantly reduces wear. Hydraulic or pneumatic hoses may pass through the housing 16 and connect to engage and disengage the cylinder assembly 12 through remote actuation.

An engage air or oil port 26 may allow air or oil pressure to enter the engage bore 39 to move the movable piston 18 and sliding sleeve 20. The movement of the sliding sleeve 20 and movable piston 18 from pressure applied to the engage bore 39 engages the clutch. Similarly, a disengage air or oil port 28 will feed hydraulic pressure to the disengage bore 42 and pull the movable piston 18 and sliding sleeve 20 away from the clutch to disengage it. The pivot motion of the link 17 is what ultimately engages or disengages the clutch pressure plate 30 and, as stated, the over-center design of the links lock the link 17 and clutch pressure plate into the engaged position without continued pressure.

The movement of the sliding sleeve 20 and movable piston 18 may be activated with any existing lever, switch, button, or other actuation device in the proximity of the operator to deliver hydraulic pressure to either the engage bore 39 or the disengage bore 42. Preferably, an existing device may be used or a switch may be retro-fitted anywhere on the vehicle.

FIGS. 3 and 5 show the same ROC clutch as discussed above with respect to FIGS. 1, 2 and 4, but in a disengaged configuration. In FIGS. 3 and 5 the sliding sleeve 20 is retracted away from the clutch pressure plate 30 and the link 17 is slightly pivoted. As mentioned above, this may be done through control of hydraulics or pneumatics which send pressurized fluid into the disengage air or oil port 28. The pressurized fluid may then push the sliding sleeve 20 along the shaft 14 and into the rigid piston 10 thus pivoting the link 17 which retracts the lever 24 away from the clutch pressure plate.

The link 17 is shown in an approximately 45-degree angle indicating that the entire sliding sleeve 20 has shifted axially along the shaft 14. Note that in both positions of the link 17 indicated by FIGS. 2 and 3, engaged and disengaged respectfully, there is no pressure applied to either the engage air or oil port 26 or the disengage air or oil port 28. Pressure is only applied while the sliding sleeve 20 is moving along the shaft 14. Once engaged, the link 17, sliding sleeve 20, and movable piston 18 are all locked in place by the over-center design and do not require constant pressure. This is unique as the known systems require consistent pressure to be applied when a remote hydraulic actuator is in use. By not applying pressure all the time, wear is significantly decreased and the serviceable life of the clutch 22 and the entire actuation mechanism and hydraulic system is increased. Ultimately, heat and use of the actuation system is significantly decreased.

The following description relates to specifics regarding the over-center locking mechanism of the clutch assembly. A cam may also be used with the same cylinder assembly 12 as well.

Figure 6:
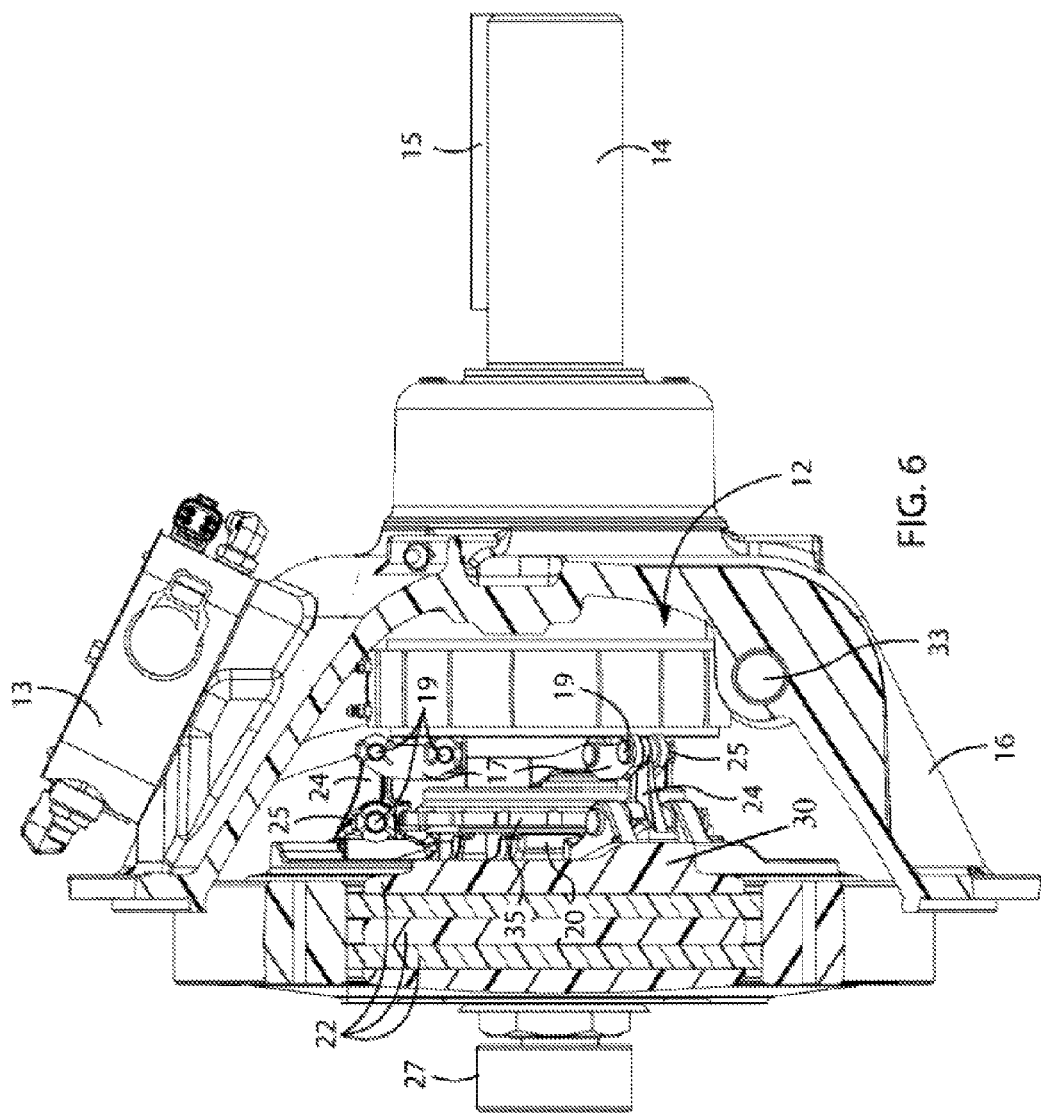
FIG. 6 is a partial cross sectional side view of the retrofittable ROC clutch of FIG. 1 installed with alternative fasteners.

Referring now to FIG. 6, a partial cross-sectional view of the preferred embodiments is shown. Lever hole 33 indicated where the manually-operated lever which controlled the clutch actuation passed through the housing 16. The lever is eliminated with the invention and as such the lever hole 33 may be kept open or sealed shut. In operation, shaft 14 turns as it passes through the center of the cylinder assembly 12 and through the clutch 22. A series of levers 24 is engaged with links 17 to apply pressure on the clutch pressure plate 30 when pressure is applied to the cylinder assembly 12. Due to the geometry and shape of the levers 24 and links 17, the clutch pressure plate 30 remains engaged once the links 17 are in the over-center position as is shown in FIGS. 2, 4, and 6. The links 17 are connected by pivot pins 19 and pin retainers 25 and supply the action and clamping force to the clutch pressure plate 30. The links 17 have an over-center lock point which is a fixed stop and linkage. Once in the over-center position, as depicted in FIGS. 2, 4, and 6, the links 17 cannot move or unlock unless the sliding sleeve 20 is retracted back toward cylinder assembly 12.

Even and uniform clamping force about the circumference of the clutch pressure plate 30 is attained with the use of multiple links 17, as best seen in FIGS. 6 and 8, symmetrically placed around the shaft 14. Each one of the links 17 symmetrically placed around the shaft 14 ensure an even clamp load is placed on the clutch pressure plate for even wear and prevents binding of the sliding sleeve 20. The geometry and location of the links 17 is pre-existing and for this reason it is retained when the cylinder assembly 12 is retrofitted. By retaining the links 17, the over-center locking action remains functional and hydraulic pressure is only required to move the links 17. Once in the over-center position, as in FIGS. 2, 4, and 6, the cylinder assembly ceases to require hydraulic pressure through the engage air or oil port 26. This ensures long service life of the cylinder assembly 12 and the related components. Once the clutch pressure plate 30 is desired to be disengaged, pressure may be applied to the disengage air or oil port 28 and the sliding sleeve 20 is retracted, placing the links 17 in a disengaged position as is shown in FIGS. 3 and 5.

Figure 7:
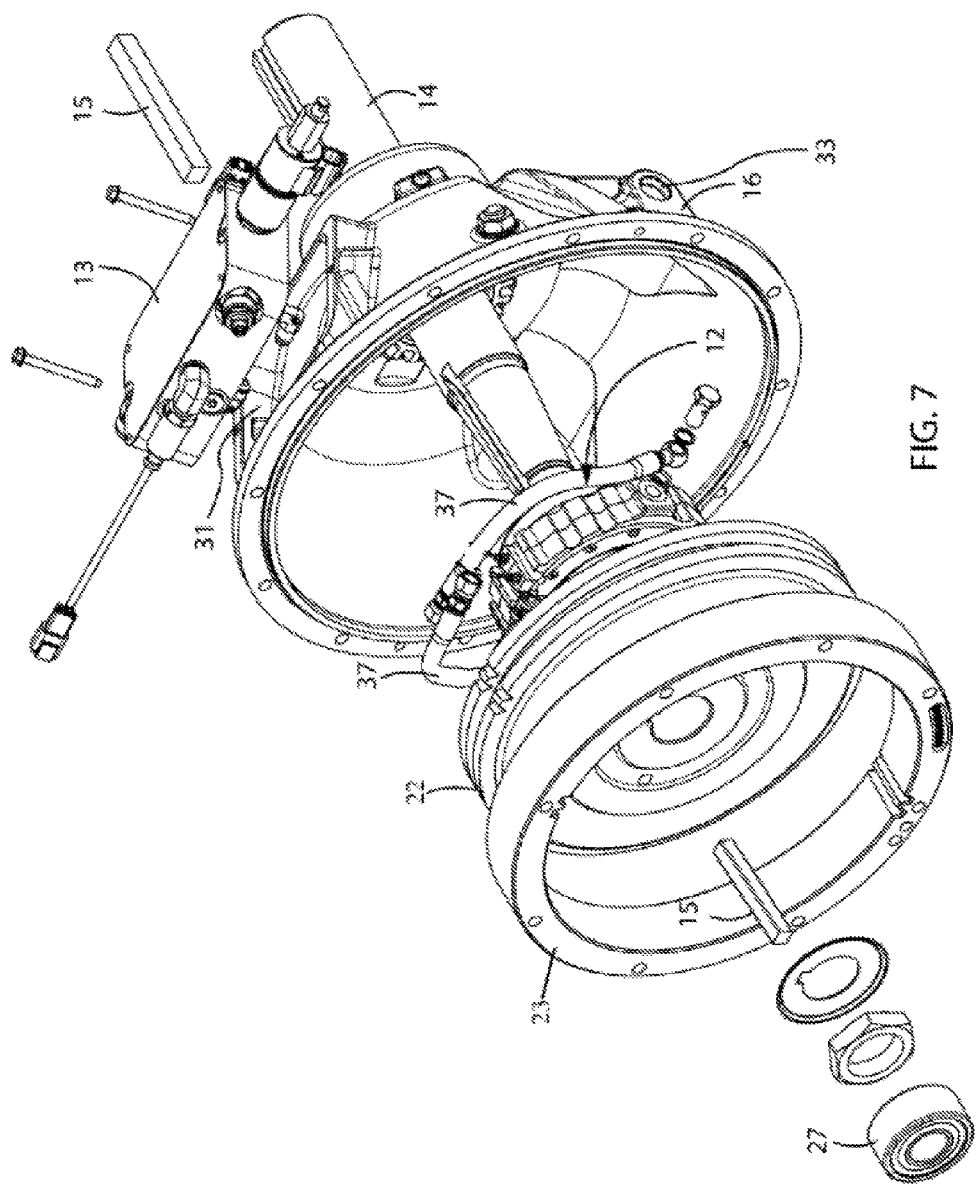
FIG. 7 is a partially exploded perspective view of the retrofittable ROC clutch of FIG. 1 installed with alternative fasteners.

The function of the sliding sleeve 20 is further demonstrated in FIG. 7 which shows a partially exploded view of the housing 16 and the contents within. The hydraulic control valve 13 may be operated remotely through an electrical connection. This allows the operator to control the cylinder assembly 12 from any location. Alternatively, the hydraulic control valve 13 may be commanded wirelessly from any location. To minimize costs, the hydraulic control valve 13 is manufactured to attach to the housing 16 above an inspection port 31, but may also be remotely mounted with hoses connected to the cylinder through any opening in the housing. The inspection port 31 is pre-existing in the housing 16 to allow an operator to perform adjustments on the actuation point of the links 17. An adjustment ring 35, best shown in FIG. 6, may be rotated either clockwise or counter-clockwise to shorten or lengthen the travel of the sliding sleeve 20. This adjustment ring 35 and its function remain intact following the retrofit of the cylinder assembly 12. In order to perform adjustment, the hydraulic control valve, or inspection cover, is separated from the housing 16, and the adjustment ring 35 may be rotated by striking it with a blunt object such as a screw driver to rotate it. The adjustment moves the sliding sleeve 20 toward the clutch pressure plate 30 to shorten its travel distance or away from the clutch pressure plate 30 to lengthen its travel.

Hydraulic control valve 13 connects to the cylinder assembly 12 with hydraulic hoses 37 and directs pressurized hydraulic fluid through each one of the engage air or oil port 26 and the disengage air or oil port 28, best shown in FIGS. 1-3. The cylinder assembly 12 is connected to the housing 16 as shown in FIGS. 6 and 7. The cylinder assembly 12 moves the sliding sleeve 20 along the shaft 14.

FIGS. 8a and 8b show various views of the cylinder assembly 12. As shown in FIG. 8a, the sliding sleeve 20 rides in a linear path through the use of a thrust bearing 29. The thrust bearing 29 is positioned in the inner diameter 41 of the cylinder assembly 12 and the bearing surface 43 of the sliding sleeve is inserted within the thrust bearing 29. As a result, the entire sliding sleeve 20 spins with the shaft 14 while the cylinder assembly 12 remains in a fixed position. The thrust bearing 29 ensures the sliding sleeve is kept in a concentric position so as not to apply any lateral loads on the links 17. Therefore, the links 17 pivot about the pivot pins 19 to engage and disengage the clutch pressure plate 30.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

I claim:

1. A fluid actuated, over-center clutch for a power take off unit that defines an engaged state for transmitting power through the power takeoff unit and a disengaged state for not transmitting power through the power takeoff unit, over-center clutch for a power take off unit comprising:
    a stationary and hollow cylinder assembly with a movable piston in contact with a thrust bearing;
    a sliding sleeve in contact with the thrust bearing configured to push and pull the sliding sleeve along the cylinder;
    a shaft passing through the central axis of the hollow portion of the cylinder assembly; and
    a housing containing the cylinder assembly and the shaft; and
    wherein the sliding sleeve is selectively actuated such that a pressure is applied to the cylinder only during at least one of engagement and disengagement for changing between the engaged and disengaged states of the power takeoff unit, and the pressure is not applied when the sliding sleeve is not in motion and the power takeoff unit is in either one of the engaged and disengaged states.

2. The fluid actuated, over-center clutch for a power take off of claim 1, wherein the fluid actuated, over-center clutch is configured to retrofit on the power take off unit.

3. The fluid actuated, over-center clutch for a power take off of claim 1, wherein the engagement and disengagement periods only occur when the sliding sleeve is in motion.

4. The fluid actuated, over-center clutch for a power take off of claim 1, wherein the sliding sleeve is selectively actuated in a linear motion during the engagement period and in an opposite linear motion during the disengagement period.

5. The fluid actuated, over-center clutch for a power take off of claim 1, wherein one of a hydraulic and a pneumatic pressure is configured to actuate the sliding sleeve.

6. A retrofittable clutch for a power take off unit comprising:
   a hollow cylinder assembly;
   a sliding sleeve slidably attached to the cylinder assembly configured to selectively slide in opposing directions;
   a shaft passing through the central axis of the hollow cylinder assembly; and
   wherein a pressure is selectively applied to the cylinder assembly only during motion of the sliding sleeve, and wherein the pressure is not continuously applied when the sliding sleeve is in a stationary position.

7. The retrofittable clutch for a power take off unit of claim 6, wherein at least part of the cylinder assembly is in contact with a thrust bearing and is configured to selectively apply the force to the sliding sleeve, causing the sliding sleeve to move in opposing directions along the cylinder.

8. The retrofittable clutch for a power take off unit of claim 6, wherein the selectively applied pressure to the cylinder assembly is one of a hydraulic and pneumatic pressure from a power source.

9. The retrofittable clutch for a power take off unit of claim 6, wherein the clutch is a hydraulically actuated, over-center clutch configured to retrofit on the power take off unit.

10. The retrofittable clutch for a power take off unit of claim 9, wherein a pre-existing, mechanical linkage is connected to the retrofittable clutch and a pre-existing hydraulic pressure supply is configured to selectively apply the pressure to the cylinder.

11. A method of retrofitting an actuation system for an over-center clutch on a power take off unit comprising:
    providing a cylinder assembly;
    connecting a sliding sleeve to the cylinder assembly;
    attaching a thrust bearing in contact with the sliding sleeve configured to selectively apply a linear force to the sliding sleeve in opposing directions;
    passing a shaft passing through the central axis of the hollow portion of the cylinder assembly;
    containing the cylinder assembly and the shaft within a housing;
    selectively applying a pressure to the sliding sleeve creating a linear force on the thrust bearing to engage the over-center clutch to change an operational state of the power take off unit between an engaged state and a disengaged state; and
    not applying pressure when the sliding sleeve is in a stationary position and the power takeoff unit is in either one of the engaged and disengaged states.

12. The method of claim 11, further comprising using the power take off unit to supply the pressure.

13. The method of claim 11, further comprising utilizing a pre-existing, mechanical linkage from the power take off unit to engage and disengage the clutch.

14. The method of claim 11, further comprising utilizing a pre-existing hydraulic system of a tool to selectively apply the pressure to the sliding sleeve.

15. The method of claim 11, further comprising selectively applying a pressure creating a linear force on the sliding sleeve to disengage the clutch.

16. The method of claim 11, further comprising keeping the cylinder in an engaged position without constantly applying the pressure.

17. The method of claim 11, further comprising removing at least a portion of a pre-existing mechanical clutch linkage from the power take off unit.

18. The method of claim 17, further comprising replacing the removed portion of the pre-existing mechanical clutch linkage from the power take off unit with the cylinder assembly.

19. The method of claim 11, further comprising moving a lever with the sliding sleeve to engage and disengage the over center clutch.

20. The method of claim 11, further comprising containing the cylinder assembly within the housing.

* * * * *